(12) United States Patent
Nelson et al.

(10) Patent No.: US 8,550,649 B2
(45) Date of Patent: Oct. 8, 2013

(54) STEREOSCOPIC ILLUMINATION SYSTEM FOR RETROREFLECTIVE MATERIALS

(76) Inventors: Webb T. Nelson, Woodinville, WA (US); Mark J. Chernick, Woodinville, WA (US)

( * ) Notice: Subject to any disclaimer, the term of this patent is extended or adjusted under 35 U.S.C. 154(b) by 219 days.

(21) Appl. No.: 12/786,769

(22) Filed: May 25, 2010

(65) Prior Publication Data

US 2011/0199679 A1   Aug. 18, 2011

Related U.S. Application Data

(60) Provisional application No. 61/304,513, filed on Feb. 15, 2010.

(51) Int. Cl.
*F21V 21/084*   (2006.01)

(52) U.S. Cl.
USPC ............................ 362/105; 362/230; 362/234

(58) Field of Classification Search
USPC ......... 362/103, 105, 106, 227, 230, 234, 253, 362/157, 184
See application file for complete search history.

(56) References Cited

U.S. PATENT DOCUMENTS

| | | | |
|---|---|---|---|
| 1,688,113 A | 10/1928 | Bornkessel | |
| 1,879,512 A * | 9/1932 | Rotea | 362/105 |
| 3,060,308 A * | 10/1962 | Fortuna | 362/105 |
| 4,195,918 A | 4/1980 | Freche et al. | |
| 4,254,451 A | 3/1981 | Cochran, Jr. | |
| 4,283,127 A | 8/1981 | Rosenwinkel et al. | |
| 4,991,851 A | 2/1991 | Melesio | |
| 5,567,039 A | 10/1996 | Sims | |
| 5,592,245 A | 1/1997 | Moore et al. | |
| 5,722,762 A | 3/1998 | Soll | |
| 5,741,060 A * | 4/1998 | Johnson | 362/106 |
| 6,116,744 A * | 9/2000 | Batterman | 362/103 |
| 6,234,645 B1 * | 5/2001 | Borner et al. | 362/231 |
| 6,390,640 B1 | 5/2002 | Wong et al. | |
| 6,482,108 B1 | 11/2002 | McLaughlin | |
| 6,535,182 B2 | 3/2003 | Stanton | |
| 6,543,899 B2 | 4/2003 | Covannon et al. | |
| 6,554,444 B2 | 4/2003 | Shimada et al. | |
| 6,575,588 B2 | 6/2003 | Strehl | |
| 6,733,150 B1 | 5/2004 | Hanley | |
| D501,290 S | 2/2005 | Zuloff | |
| 6,955,444 B2 | 10/2005 | Gupta | |
| 7,000,841 B2 * | 2/2006 | Becker | 235/462.42 |
| 7,027,222 B2 * | 4/2006 | Takahashi et al. | 359/463 |

(Continued)

*Primary Examiner* — Y My Quach Lee
(74) *Attorney, Agent, or Firm* — LaMorte & Associates, P.C.

(57) ABSTRACT

A system and method of illuminating a portable object even when the object is otherwise well illuminated by ambient light. Retroreflective material is provided on the exterior of the portable object. The retroreflective material may be pigmented to absorb most light and reflects only light within a predetermined frequency range. An illumination assembly is provided that contains a first light source and a second light source. The first light source and the second light source are positioned a short distance apart so that they produce stereoscopic beams of light. Each of the stereoscopic beams of light is monochromatic. Furthermore, the frequency of each of the stereoscopic beams of light falls within the predetermined frequency range. When the stereoscopic beams of light strike the retroreflective material, it shines even in bright ambient light.

14 Claims, 5 Drawing Sheets

(56) References Cited

U.S. PATENT DOCUMENTS

| | | |
|---|---|---|
| 7,163,309 B2 | 1/2007 | Sohn |
| 7,192,151 B2 | 3/2007 | Clupper et al. |
| 7,234,831 B1 | 6/2007 | Hanley |
| 7,438,409 B2 | 10/2008 | Jordan |
| 7,450,250 B2 | 11/2008 | Venkatesh et al. |
| 7,506,992 B2 * | 3/2009 | Carter .......................... 362/105 |
| 7,562,979 B2 | 7/2009 | Waters |
| 7,708,422 B2 | 5/2010 | Sohn |
| 7,945,311 B2 | 5/2011 | McCloy et al. |
| 2005/0099799 A1 * | 5/2005 | Cugini et al. ................. 362/105 |
| 2006/0007671 A1 | 1/2006 | Lavoie |
| 2006/0281584 A1 | 12/2006 | Ramsay |
| 2011/0187989 A1 | 8/2011 | Waters |

* cited by examiner

STEREOSCOPIC ILLUMINATION SYSTEM FOR RETROREFLECTIVE MATERIALS

RELATED APPLICATIONS

This application is a continuation-in-part of U.S. Provisional Patent application No. 61/304,513, entitled Stereoscopic Illumination System, filed Feb. 15, 2010.

BACKGROUND OF THE INVENTION

1. Field of the Invention

In general, the present invention relates to illumination systems that include lights that are worn on a person's head. More particularly, the present invention relates to illumination systems having spaced sources of illumination that create stereoscopic beams of light.

2. Prior Art Description

Battery powered flashlights have been in existence for over a century. During this long period of time, flashlights have been configured in countless ways, including configurations that are intended to be worn on a user's head. Mounting a flashlight to a user's head has many benefits. A head-mounted flashlight automatically illuminates the area in which a person is facing. The beam of a flashlight also focuses a person's attention to the objects being illuminated by the beam of light. Furthermore, a head-mounted flashlight enables a person to have two free hands. It is for these reasons that miners use helmets with mounted flashlights. In more common applications, there are many flashlights marketed to campers and runners that have headbands that enable the flashlight to be worn on the forehead. Likewise, there are many flashlight designs that are configured to attach to the brims of hats.

Flashlights are typically designed to shine white light in a single beam of light. The light from the flashlight illuminates everything within the range of the beam. However, due to the polychromatic nature of the light, the beam of the flashlight readily mixes with ambient light. Accordingly, the beam of a flashlight is often impossible to detect in any area that is exposed to daylight or in a space that is well lit from other light sources.

It is common sense that a lost object can be more readily found if it is easy to see. This is why flashlights are useful in finding objects in dark places. However, what if an object is lost in a well lit place where a beam of flashlight has no effect?

The present invention discloses an illumination system that can be used to illuminate targeted objects in otherwise well lit locations. The illumination system makes the targeted object brighter than other untargeted objects even in bright ambient light. The illumination system also focuses a person's attention to a confined area so that objects that are lost in plain sight can be rapidly found. The details of the present invention illumination system are described and claimed below.

SUMMARY OF THE INVENTION

The present invention is a system and method of illuminating a target object even when the object is otherwise well illuminated by ambient light. The system uses retroreflective material that is provided on the exterior of the target object. The retroreflective material may be pigmented so that the retroreflective material absorbs most light and reflects only light that falls within a predetermined frequency range.

An illumination assembly is provided that contains a first light source and a second light source. The first light source and the second light source are positioned a short distance apart so that they produce stereoscopic beams of light. Each of the light sources is produced by one or more light emitting diodes. The light emitting diodes are each monochromatic. However, the color of each of the light emitting diodes need not be the same. The frequency of each of the stereoscopic beams of light that are created by the light emitting diodes falls within the predetermined frequency range that is reflected by the retroreflective material.

The first light source and the second light source are either mounted to a user's head near the eyes or positioned on an object in front of the user's eyes. In this manner, the stereoscopic beams of light shine in the same direction as the user's line of sight. When the stereoscopic beams of light illuminate the retroreflective material, the retroreflective material reflects the beams of light back to the user. The intensity of the reflected light is particularly strong along the user's line of sight. The retroreflective material, therefore, begins to shine brightly with reflected light, even when there is an ample supply of ambient light. As a result, any object containing the retroreflective material can be quickly found in an area simply by scanning the area with the stereoscopic beams of light and waiting for the retroreflective material to shine.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention illumination system can be embodied in many ways, the embodiments illustrated show the system configured both as a head-worn system and as a handheld toy. These embodiments are selected in order to set forth two of the best modes contemplated for the invention. The illustrated embodiments, however, are merely exemplary and should not be considered a limitation when interpreting the scope of the appended claims.

Figure 1:
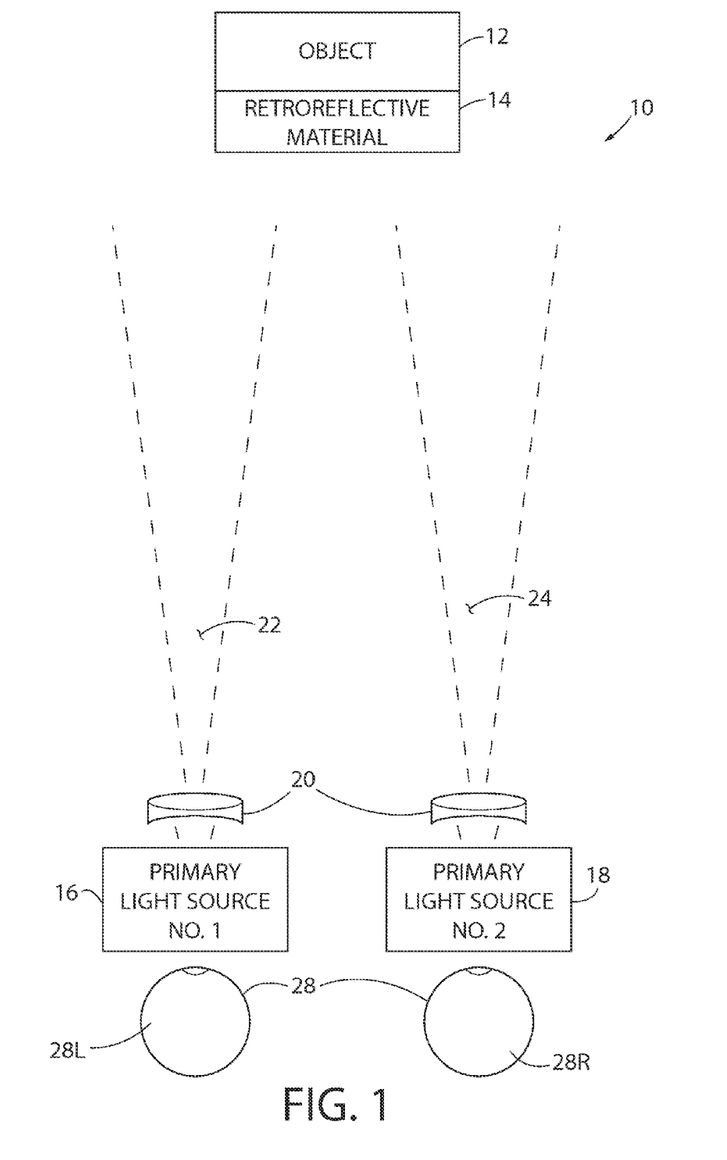
FIG. 1 is an exemplary schematic of the present invention illumination system.

Referring to FIG. 1, an operational schematic of the present invention illumination system 10 is shown in order to illustrate the functionality of the illumination system 10. Physical embodiments of the system that utilize the operational schematic are later presented in FIG. 4 and FIG. 5.

In the shown schematic of FIG. 1, an object 12 is shown. The object 12 can be anything that is commonly misplaced, such as a key ring, a remote control unit, a case for eyeglasses, and the like. Alternatively, the object 12 can be anything that needs to be intensely visually tracked, such as a target for a toy shooting game, a flag in a capture-the-flag game, or a hidden prize in a hind-and-seek game. Regardless of the functional nature of the object 12, the object 12 has an exterior surface containing retroreflective material 14.

Retroreflective materials are widely commercially available. Retroreflective material used micro-prisms or reflective spherical beads that are bound in a polymer. The polymer can be clear. However, the polymer is often pigmented to provide the retroreflective surface with a particular color. For instance, retroreflective traffic stop signs are pigmented red so that appear to reflect back red light.

Most any such available retroreflective material can be used as part of the present invention. However, it is preferred that the retroreflective material 14 be pigmented so that it has its highest reflectivity in a specific band of light frequencies. Pigmented retroreflective material absorbs some light energy in the color frequencies outside the pigmentation. However, pigmented retroreflective materials reflect nearly all the incoming light having the same color frequencies as the pigmentation. For the purpose of this specification, it should be understood that the retroreflective material 14 is most reflective to light frequencies within a predetermined frequency range (PFR) and the pigmentation used for the retroreflective material 14 absorbs some light outside of the predetermined frequency range (PFR).

Two primary light sources 16, 18 are provided. Each of the light sources 16, 18 are preferably light emitting diodes (LEDs) or small arrays of light emitting diodes. However, other light sources, such as laser light sources can also be used. The two light sources 16, 18 emit monochromatic light at a frequency that falls within the predetermined frequency range (PFR) of the retroreflective material 14. The two light sources 16, 18 may emit the same frequency of light, but this need not be the case. The frequency of light emitted by each of the light sources 16, 18 can be different provided the emitted light from each is primarily monochromatic and that the primary emitted frequency of light falls within the predetermined frequency range (PFR).

The predetermined frequency range (PFR) is preferably less than 50 nms. The preferred range for green light ranges between 510 nm and 560 nm. However, a predetermined frequency range (PFR) of less than 10 nm would also work. It is also preferred that the predetermined frequency range (PFR) be in or near the green frequencies of the visible spectrum since the human eye is more sensitive to variations in green than any other color. However, for applications such as toy games, other frequency ranges such as red light frequencies and blue light frequencies can be utilized.

Objective elements 20 may be used to help focus the light from the light sources 16, 18 into controlled beams of light 22, 24. The objective elements 20 can take the form of lenses, fiber optic conduits or other collimator assemblies. The objective elements 20 need not be provided if the beams of light 22, 24 generated by the light sources 16, 18 are adequately confined to beams through the structure of the LEDs or through the use of contoured reflectors (not shown).

The beams of light 22, 24 propagate away from the light sources 16, 18 along generally parallel paths. It is preferred that the light beams 16, 18 be confined so that the spread of the beams 16, 18 do not overlap by more than fifty percent at any distance less than at least three feet in front of the light sources 16, 18.

It will be understood that the average person has two eyes 28 and that the center of those eyes are typically spaced between 2.5 and 3.5 inches apart. This ocular spacing averages just under 3 inches in adults. The two primary light sources 16, 18 are positioned either above or below the center of each eye 28. Consequently, the two primary light sources 16, 18 are spaced between 2.5 and 3.5 inches apart. By positioning the two primary light sources 16, 18 in such a manner, the person viewing the beams of light 22, 24 views the two beams of light 22, 24 stereoscopically. That is, each of the beams of light 22, 24 is in line with the line of sight from each eye 28. Consequently, to the user, two beams of light 22, 24 are not seen. Rather, the optical illusion of a single beam of light is observed.

Retroreflective material is designed to reflect light back in the same direction from which it arrives regardless of the angle of incidence between the incoming light and the retroreflective material. However, the intensity of the reflected light is directly proportional to the angle of incidence. For retroreflective material, the coefficient of retroreflective luminance $R_L$ is the ratio of luminance in the direction of observation $R_A$, to the cosine of the angle of observation (A). This is expressed as:

$$R_L = \frac{R_A}{\cos A}$$

Figure 2:
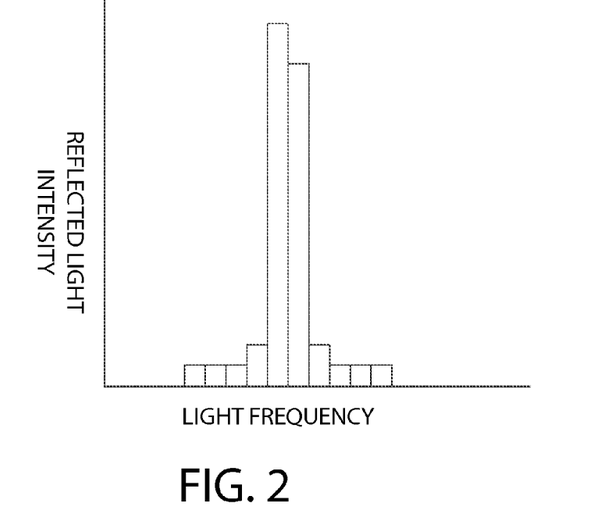
FIG. 2 is a graph showing the intensity of reflected light received by a user's left eye.

It will therefore be understood that the intensity of the light reflected by the retroreflective material 14 is most intense when the retroreflective material 14 is observed directly in line with a beam of light such that the angle of incidence is zero and the cosine of the angle of incidence is one. In the application of the present invention, there are two beams of light 22, 24 that are created by the two primary light sources 16, 18. Each beam of light 22, 24 reflects from the retroreflective material 14. Referring to FIG. 2 in conjunction with FIG. 1, it can be seen that the first eye 28L receives the most reflected light from the first beam of light 22 that lays in line with the line of sight for that eye 28L. The intensity of the light reflected from the beam of light 22 aligned with eye 28L is slightly greater than the reflected light received from the second beam of light 24 because of the difference in the angle of incidence between the first beam of light 22 and the second beam of light 24. However, the intensity of the reflected light from both beams 22, 24 is far greater than the intensity of reflected ambient light. Likewise, referring to FIG. 3 in conjunction with FIG. 1, it can be seen that the second eye 28R receives the most reflected light from the second beam of light 24 that lays in line with the line of sight for the second eye 28R. The intensity of the light reflected from the beam of light 24 aligned with the second eye 28R is slightly greater than the reflected light received from the first beam of light 22 because of the difference in the angle of incidence between the first beam of light 22 and the second beam of light 24. However, the reflected light from both beams 22, 24 is far greater than the intensity of reflected ambient light.

The brain receives images from the two eyes simultaneously and perceives the information from the two eyes as a single image. The result is that the brain superimposes the intensity information contained in both FIG. 2 and FIG. 3. The result is a reflection intensity to the person aligned with the light sources 16, 18 that is over twice as bright as the reflected ambient light. Furthermore, the reflection intensity perceived by a person aligned with the light sources 16, 18 is far greater than what would be perceived by any other observer who is not aligned with the light sources 16, 18. This is because of the greater angle of incidence between the beams of light and the user's line of sight.

Referring back solely to FIG. 1, it will be understood that as a user moves his/her head, the intensity of the reflected light peaks dramatically when the beams of light 22, 24 are directly aligned with the retroreflective material 14. This phenomenon makes searching for an object 12 containing retroreflective material 14 very easy. To perform a search, a person need only align the light sources 16, 18 with his/her eyes 28L, 28R. Both the eyes 28L, 28R and the light sources 16, 18 are then moved in unison to visually scan a search area. If a retroreflective material 14 is present within the search area, that retroreflective material 14 will brightly shine with reflected light the moment that the beams of light 22, 24 impinge upon the retroreflective material 14. The retroreflective material 14 will also appear to glow in the color of the light sources 16, 18, since the retroreflective material 14 is engineered to reflect those particular frequencies of light. The result is that the retroreflective material 14 shines brightly in an easily perceived color the moment a person's eyes are aligned with the lost object 12. A lost object 12 containing the retroreflective material 14 can therefore be located in seconds, just by optically scanning the area.

Figure 4:
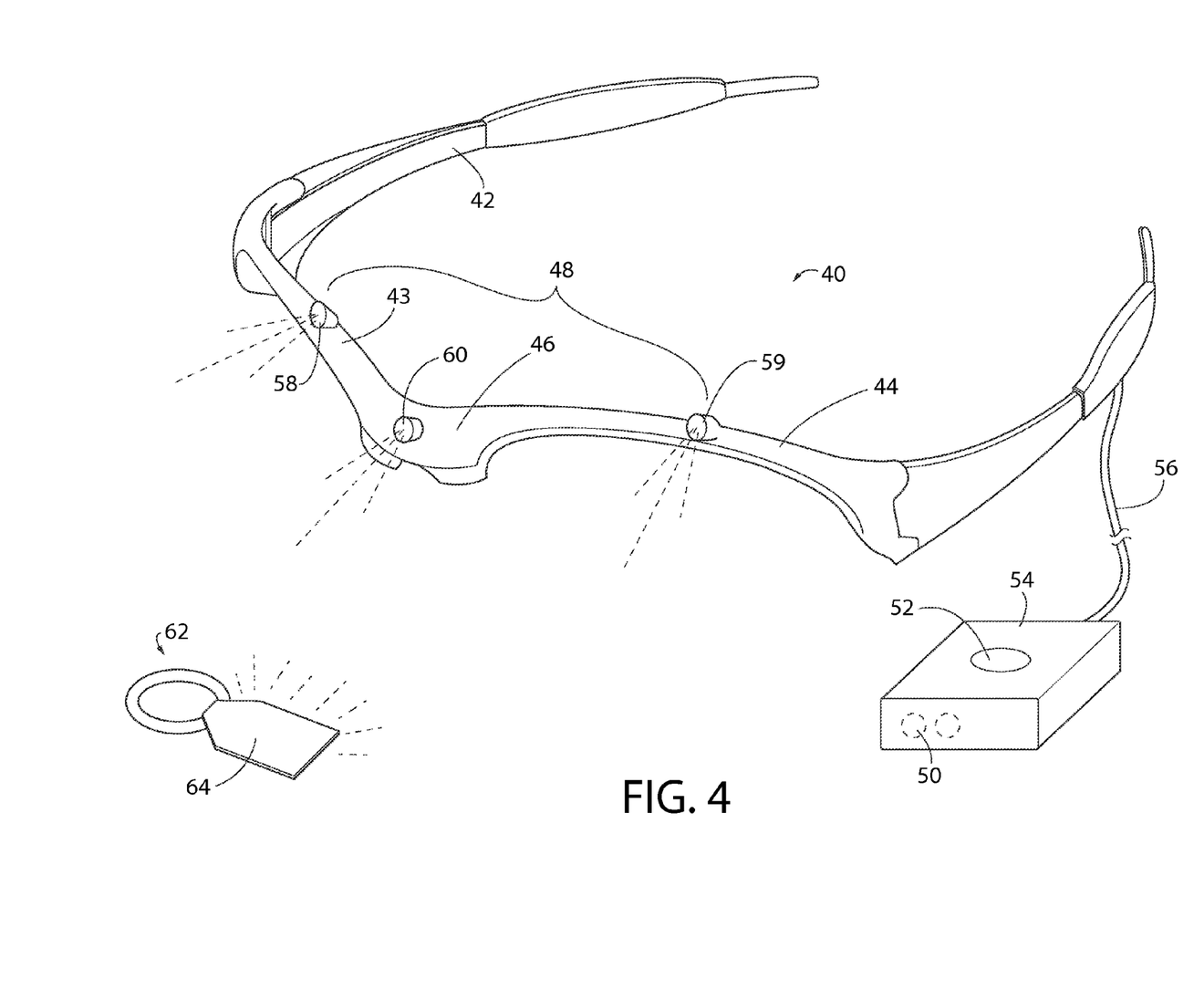
FIG. 4 is an exemplary embodiment of the present invention embodied in a set of eyeglass frames.

Referring to FIG. 4, a set of eyeglass frames 40 are shown that embody the present invention illumination system. The eyeglass frames 40 have temple elements 42 that pass over the ears and enable the eyeglass frames 40 to be supported on the face of the user.

The eyeglass frames 40 have frame sections 43, 44 that pass over each eye of the user. The eyeglass frames 40 also have a bridge section 46 that passes over the nose between the two frame sections 43, 44.

An array 48 of light emitting diodes (LEDs) are connected to the eyeglass frames 10. The array 48 of LEDs is powered by a battery pack 50 and is selectively controlled by an on/off switch 52. The battery pack 50 and on/off switch 52 can be mounted to the eyeglass frames 40. However, in the shown embodiment, the battery pack 50 and the on/off switch 52 are embodied in a handheld control unit 54 that is tethered to the eyeglass frames 40 by a wire cable 56.

The array 48 of LEDs includes two primary light sources 58, 59. The two primary light sources 58, 59 are LEDs. Each of the primary light sources 58, 59 emits light of a first monochromatic color. The array 48 of LEDs also contains a secondary light source 60 disposed midway between the primary light sources 58, 59. The secondary light source 60 shown is also monochromatic and emits a second monochromatic color. The two primary light sources 58, 59 of the first color are mounted to the frame sections 43, 44 directly over the centers of the two eyes. Both of the primary light sources 58, 59 shine light outwardly in the line of sight.

Since the beams of light emitted by the two primary light sources 58, 59 are emitted directly over the eyes, the light beams are stereoscopic and are visualized by the eyes as being a single beam of monochromatic light.

The secondary light source 60 is centered and is of the second color. The secondary light source 60 emits light in a beam that bisects the convergence of the beams from the primary light sources 58, 59. Accordingly, all three beams converge and appear as a single beam of light to the user wearing the eyeglass frames 40.

The two primary light sources 58, 59 are monochromatic and emit the same light frequency. The light frequency is preferably in the green range of the visible spectrum, being between 510 nm and 560 nm. Green is preferred because the human eye has the most sensitivity to green light. The secondary light source 60 is monochromatic and has a frequency slightly different from that of the primary light sources but still within the same preferred frequency range (PFR). Preferably, the secondary light source 60 emits light between 50 nm and 100 nm greater or lesser than the light frequency of the primary light sources 58, 59. As such, the secondary light source 60 can still emit green light, but a lighter or darker green than that of the primary light sources 58, 59.

Although green light is perceived best by the human eye, it will be understood that the predetermined frequency range (PFR) can be selected from any part of the visible spectrum. Consequently, the colors of the LEDs are a matter of design choice. What is of primary importance is that each of the LEDs emits light within the same predetermined frequency range (PFR).

A secondary object 62 is provided. The secondary object 62 contains retroreflective material 64. The secondary object 62 can be stickers, toy vehicles, golf balls, or any other object.

The pigmentation of the retroreflective material 64 is preferably the same color as the light emitted by the primary light sources 58, 59. Alternatively, the pigmentation can be a color frequency that falls between the color of the primary light sources 58, 59 and the secondary light source 60. For example, if the primary light sources 58, 59 emit green light at 510 nm and the secondary light source 60 emits light at 540 nm, the pigmentation used with the retroreflective material 64 is preferably between 500 nm and 550 nm.

Figure 5:
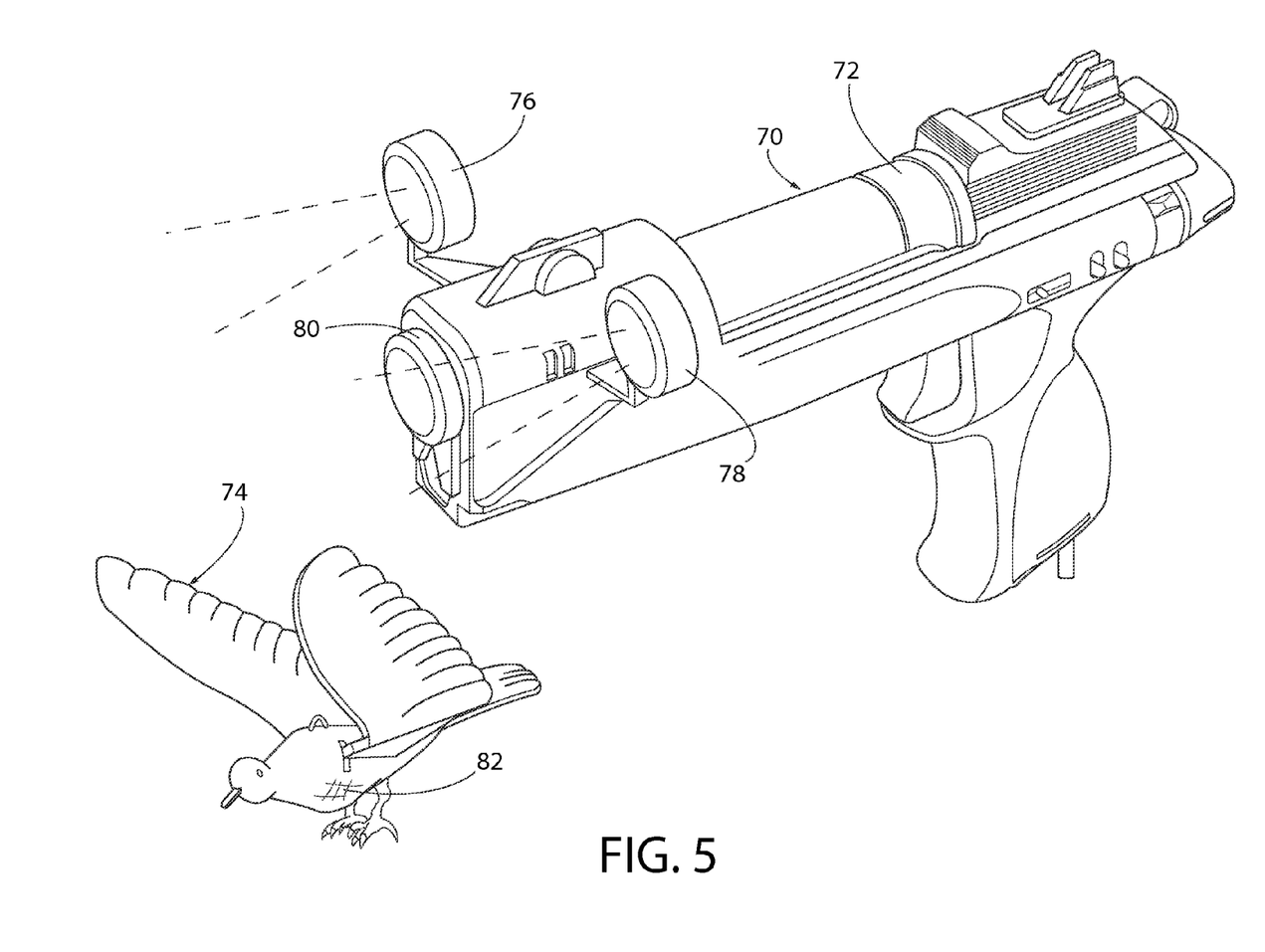
FIG. 5 is an exemplary embodiment of the present invention embodied in a handheld toy.

Referring to FIG. 5, a third exemplary embodiment of the present invention system is illustrated. In this embodiment, the system is embodied into a handheld toy 70.

In the toy industry, there are many toy guns that shoot beams of light at targets. The beams of light are typically in the infrared region of the spectrum. The targets range widely. However, many games contain moving targets and even flying targets. In the shown embodiment, the handheld toy 70 is a gun 72 that shoots an infrared beam of light when the trigger is pressed. The target 74 is a flying toy bird that falls from flight when struck by the infrared beam of light.

The gun 72 has two light sources 76, 78 attached to a gun barrel 80. The two light sources 76, 78 are spaced approximately tree inches apart. Furthermore, the light sources 76, 78 are positioned so that when a person sites down the gun barrel 80, the two light sources 76, 78 align with the eyes of the user.

The two light sources 76, 78 emit light in a narrow predetermined frequency range (PFR). The target 74 contains a pigmented retroreflective material 82. The pigmentation of the retroreflective material 82 is selected so that it reflects back light frequencies from the predetermined frequency range (PFR). During use, a person sites down the gun barrel 80 so that the person's eyes generally align with the light sources 76, 78. The light sources 76, 78 emit beams of light in front of the toy gun 72. The beams of light are not infrared and therefore do not effect the target 74. Rather, when the toy gun 72 is pointed directly at the target 74, the retroreflective material 82 on the target 74 will appear to glow with reflected light for the reasons previously explained. When the target 74 begins to glow, a person knows that the toy gun 72 is pointing directly at the target 74 so that the trigger can be pressed and the target 74 can be shot. The reliance upon the apparent glowing of the target 74 removes the need for a person to actually aim the toy gun 72 using the sites of the toy gun 72. The toy gun 72 therefore becomes far easier to aim and a more enjoyable toy for children with underdeveloped hand-eye coordination skills.

Figure 6:
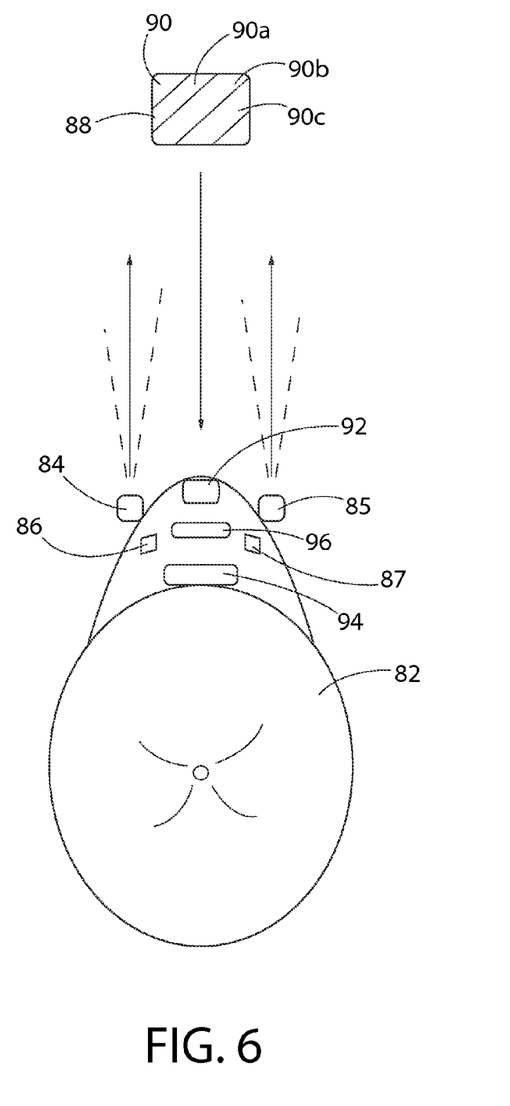
FIG. 6 is a schematic of another exemplary embodiment of the present invention.

Referring now to FIG. 6, a fourth exemplary embodiment of the present invention system is illustrated. In this embodiment, the system is embodied into a game where a person must find an object during the course of the game. A hat 82 is provided. The hat 82 contains two LED arrays 84, 85. Each of the LED arrays 84, 85 are spaced approximately three inches apart. In this manner, when the hat 82 is worn on the head, the LED arrays 84, 85 are positioned directly above a user's eyes.

Each LED array 84, 85 contains multiple monochromatic LEDs. Each of the LEDs in each of the LED arrays 84, 85 produces a different colored light. Each of the LEDs arrays 84, 85 also contains a small timing circuit 87, 88 that lights each of the LEDs in sequence for a short period of time. It will therefore be understood that each of the LED arrays 84, 85 shines monochromatic light and that the color of that monochromatic light changes periodically.

A target object 88 is provided. The target object 88 has an exterior surface containing retroreflective material 90. Although only one types of retroreflective material 90 need be provided, in a preferred embodiment, the target object 86 contains different sections of retroreflective material 90a, 90b, 90c. Each of the sections 90a, 90b, 90c is most reflective to a different colored light produced by the LED arrays 84, 85.

When the hat 82 is worn and the LED arrays 86, 87 are activated, it will be understood that the retroreflective material 90 on the target object will appear to glow once it is in the line of site of both eyes and both beams of light produced by the LED arrays 84, 85. Depending upon which of the LEDs in the LED arrays 84, 85 are shining at the moment will determine what sections 90a, 90b, 90c of the retroreflective material 90 shine the brightest.

In the embodiment of FIG. 6, a photodetector 92 is also provided. The photodetector 92 is used to trigger an activation device 94. The activation device 94 can be a light, a buzzer, a motor, or any other electromechanical device. The photodetector 92 is first coupled to a logic circuit 96. The logic circuit 96 determines if the light received by the photodetector 92 is ambient light or light reflected from the target object 88.

Figure 3:
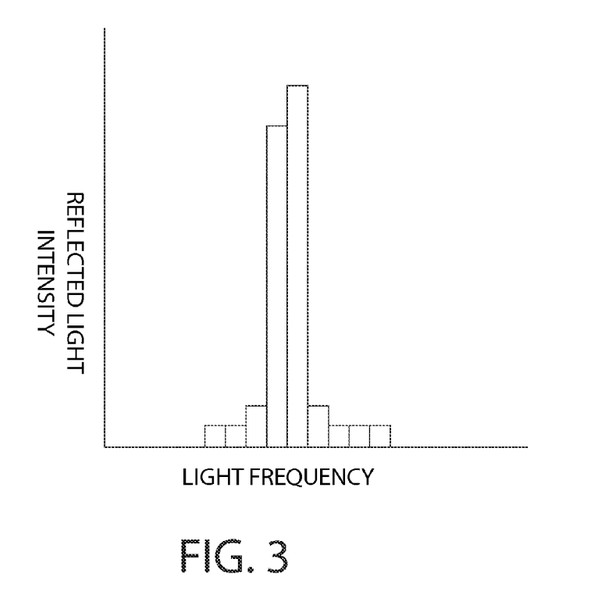
FIG. 3 is a graph showing the intensity of reflected light received by a user's right eye.

As has been previously explained in conjunction with FIG. 2 and FIG. 3, when light reflects from the retroreflective material 90, that light has a high reflective intensity at the frequency of the light being shined at the retroreflective material 90. The logic circuit 96 analyses the detected light to see if the reflected light is both above predetermined threshold intensity, and if the light is a certain color. If the detected light has an unusually high intensity and it is in the color of one of the LEDs, then it can be accurately determined that the LED arrays 84, 85 are pointed at the target object 88.

It will therefore be understood that scanning games can be played. For instance, players can be given hats and a flag can be hidden. The first person to scan the flag with the LED arrays 84, 85 will sound a buzzer.

The logic circuit 96 may only trigger the activation device 94 for one of the colors produced by the LED arrays. In this manner, a person would have to locate and object and keep it in the beams of the LED arrays 84, 85 for a full color change cycle before the activation device will trigger. This adds an element of chance to a variety of games.

It will be understood that the technology described in relation to FIG. 6 can be applied to toys, such as that shown in FIG. 5. Referring to both FIG. 5 and FIG. 6, it will be understood that the toy gun 70 can be the activation device. Thus, using the present invention, the toy gun 70 will automatically fire at the toy target 74 when the toy target 74 is aligned with the sites of the toy gun 70.

It will be understood that the embodiments of the present invention that are illustrated and described are merely exemplary and that a person skilled in the art can make many variations to those embodiments. For instance, the secondary object can be secret messages printed in a colorful page of a book and need not be a lost object or a moving target. The light sources can be mounted to the head or mounted to any object that can be aligned with the head. All such embodiments are intended to be included within the scope of the present invention as defined by the claims.

What is claimed is:

1. A system comprising:
    a target object having exterior surfaces, wherein at least one of said exterior surfaces contains retroreflective material, wherein said retroreflective material is pigmented within a predetermined color wavelength range to be most reflective to light within said color wavelength range;
    an assembly worn on a user's head, said assembly containing a first light source and a second light source that produce stereoscopic beams of light, wherein said assembly positions said first light source above a user's right eye and said second light source above a user's left eye, wherein both said stereoscopic beams of light are monochromatic and are within said color wavelength range, and wherein each of said stereoscopic beams of light have a wavelength within 50 nanometers of each other.

2. The system according to claim 1, wherein said first light source and said second light source both contain at least one light emitting diode.

3. The system according to claim 1, wherein said assembly further includes a head mounting for both said first light source and said second light source, wherein said head mounting is selected from a group consisting of eyeglass frames, straps, and hats.

4. The system according to claim 1, further including optical elements that focus said stereoscopic beams of light.

5. The system according to claim 1, further including a third light source interposed between said first light source and said second light source for creating a third beam of light.

6. The system according to claim 5, wherein said third beam of light is monochromatic and and has a frequency within said color frequency range.

7. The system according to claim 1, further including a photodetector circuit on said assembly for determining when light reflected from said retroreflective material exceeds a predetermined threshold level within said color wavelength range.

8. A system comprising:
    an illumination assembly containing a first light source and a second light source that produce stereoscopic beams of light, wherein both said stereoscopic beams of light are monochromatic and have a light wavelength that falls within a wavelength range no greater than 50 nanometers;
    a target object, remote from said illumination assembly, that has exterior surfaces, wherein at least one of said exterior surfaces contains retroreflective material that is pigmented to primarily reflect light within said wavelength range, wherein when said retroreflective material is illuminated by said stereoscopic beams of light, said retroreflective material reflects said stereoscopic beams of light back toward said first light source and said second light source.

9. The system according to claim 8 wherein said assembly is worn on a user's head so as to position said first light source proximate a user's right eye and position said second light source proximate a user's left eye.

10. The system according to claim 8, wherein said first light source and said second light source emit the same monochromatic light.

11. A method of illuminating a target object containing retroreflective material, said method comprising the steps of:
    providing a first light source that produces a first beam of light;
    providing a second light source that produces a second beam of light, wherein said first light source and said second light source are mounted to a common support at a distance of between two inches and four inches apart, and wherein said first beam of light and said second beam of light shine stereoscopically in a common direction;

orienting a user's eyes with said first beam of light and said second beam of light by positioning the user's eyes proximate said support and orienting a user's line of sight with said common direction;

moving said common direction and said line of sight in unison until both said first beam of light and said second beam of light simultaneously illuminate said target object and said retroreflective material reflects said first beam of light and said second beam of light back along said line of sight; and providing an optical sensor that detects light intensity for said beams of light that are reflected back towards said first light source and said second light source by said retroreflective material;

providing a secondary electronic device that is activated by said optical sensor when said optical sensor detects said light intensity rising over a preset threshold value.

12. The method according to claim 11, wherein said first beam of light and said second beam of light are both monochromatic.

13. The method according to claim 11, further including the step of affixing said common support to the head of a user.

14. The method according to claim 11, wherein said common support is a handheld object.

* * * * *